(12) United States Patent
Huang et al.

(10) Patent No.: US 9,444,590 B2
(45) Date of Patent: Sep. 13, 2016

(54) MOBILE COMMUNICATION SYSTEM AND METHOD, BASE STATION AND USER EQUIPMENT

(75) Inventors: Lei Huang, Shanghai (CN); Renmao Liu, Shanghai (CN); Yingyu Zhang, Shanghai (CN); Ming Ding, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/378,010

(22) PCT Filed: Jun. 3, 2010

(86) PCT No.: PCT/JP2010/059798
§ 371 (c)(1),
(2), (4) Date: Dec. 13, 2011

(87) PCT Pub. No.: WO2010/147039
PCT Pub. Date: Dec. 23, 2010

(65) Prior Publication Data
US 2012/0087333 A1    Apr. 12, 2012

(30) Foreign Application Priority Data
Jun. 17, 2009   (CN) .......................... 2009 1 0148874

(51) Int. Cl.
*H04L 5/00* (2006.01)
*H04W 28/06* (2009.01)
(Continued)

(52) U.S. Cl.
CPC ............. *H04L 5/001* (2013.01); *H04L 5/0053* (2013.01); *H04L 5/0094* (2013.01); *H04L 5/006* (2013.01); *H04L 5/0037* (2013.01); *H04W 28/06* (2013.01); *H04W 48/08* (2013.01); *H04W 99/00* (2013.01)

(58) Field of Classification Search
CPC ........... H04W 72/04; H04W 72/0453; H04W 88/02; H04W 72/042; H04W 72/1289; H04W 74/00; H04W 28/06; H04W 48/08; H04W 99/00; H04L 5/001; H04L 5/053; H04L 5/094; H04L 5/037; H04L 5/006
USPC .......................... 370/254–456; 709/201–213
See application file for complete search history.

(56) References Cited

U.S. PATENT DOCUMENTS

2010/0232373 A1*  9/2010  Nory et al. .................... 370/329
2010/0260136 A1*  10/2010  Fan et al. ...................... 370/330
(Continued)

FOREIGN PATENT DOCUMENTS

| CN | 1917409 A | 2/2007 |
|---|---|---|
| CN | 101175309 A | 5/2008 |

(Continued)

OTHER PUBLICATIONS

Nortel Networks, "Control Channel Design for the Support of Wider Bandwidth for LTE-Advanced," TSG-RANI #56bis, R1-091395, Seoul, South Korea, Mar. 23-27, 2009 (retrieved on Mar. 18, 2009), 10 pages, XP050597334A.

(Continued)

*Primary Examiner* — Ayaz Sheikh
*Assistant Examiner* — Debebe Asefa
(74) *Attorney, Agent, or Firm* — Birch, Stewart, Kolasch & Birch, LLP

(57) ABSTRACT

A mobile communication system where a base station and a user equipment communicates on multiple aggregated carriers is disclosed. In the mobile communication system, the base station notifies to the user equipment information which is relevant to inclusion of an information field indicating scheduling carrier in downlink control information format by using radio resource control signaling, and the user equipment receives, from the base station, downlink control information in the downlink control information format according to the information which is relevant to inclusion of the information field indicating scheduling carrier.

10 Claims, 6 Drawing Sheets

(51) Int. Cl.
*H04W 48/08* (2009.01)
*H04W 99/00* (2009.01)

(56) References Cited

U.S. PATENT DOCUMENTS

| | | | |
|---|---|---|---|
| 2010/0279628 A1* | 11/2010 | Love et al. | 455/70 |
| 2010/0296473 A1* | 11/2010 | Kim et al. | 370/329 |
| 2011/0194514 A1* | 8/2011 | Lee et al. | 370/329 |
| 2011/0243087 A1* | 10/2011 | Ahn et al. | 370/329 |
| 2011/0268032 A1* | 11/2011 | Kim et al. | 370/328 |

FOREIGN PATENT DOCUMENTS

| | | | |
|---|---|---|---|
| JP | 2010-183201 A | | 8/2010 |
| WO | WO 2009041785 A2 | * | 4/2009 |
| WO | WO 2009132945 A1 | * | 11/2009 |

OTHER PUBLICATIONS

Panasonic, "PDCCH Design for Carrier Aggregation," 3GPP TSG-RAN WG1 Meeting #57, R1-092230 (R1-091743), San Francisco, USA, May 4-8, 2009, pp. 1-9, XP050339652.

Partial Supplementary European Search Report, issued Oct. 2, 2015, for European Application No. 10789414.9.

3GPP TSG RAN WG1 #57 Meeting, R1-09-1781, "Support of carrier aggregation for FDD and related control signalling", Alcatel-Lucent, Agenda item 15.4 Study item on LTE-A, Bandwidth extension, May 4-8, 2009.

3GPP TSG RAN WG1 Meeting #57, R1-092219, "Summary of email discussion on bandwidth extension", Nokia, Agenda item 15.4, May 4-8, 2009.

3GPP TSG RAN WG1 Meeting #58, R1-093184, "PDCCH structure for carrier aggregation in LTE-Advanced", Sharp, Agenda item 15.4, Aug. 24-28, 2009.

3GPP TSG-RAN WG1 Meeting #57, R1-091770, "Handling DCI format and blind decoding in LTE-Advanced", Nokia, Nokia Siemens Networks, Agenda item 15.4, May 4-8, 2009.

International Search Report, dated Sep. 14, 2010, issued in PCT/JP2010/059798.

TSG-RAN WG1#54Bis, R1-083491, "Downlink Control Structure for Carrier Aggregation Approach in LTE-Advanced System", NEC Group, Agenda item 11, Sep. 29, 2008-Oct. 3, 2008.

* cited by examiner

F I G. 7
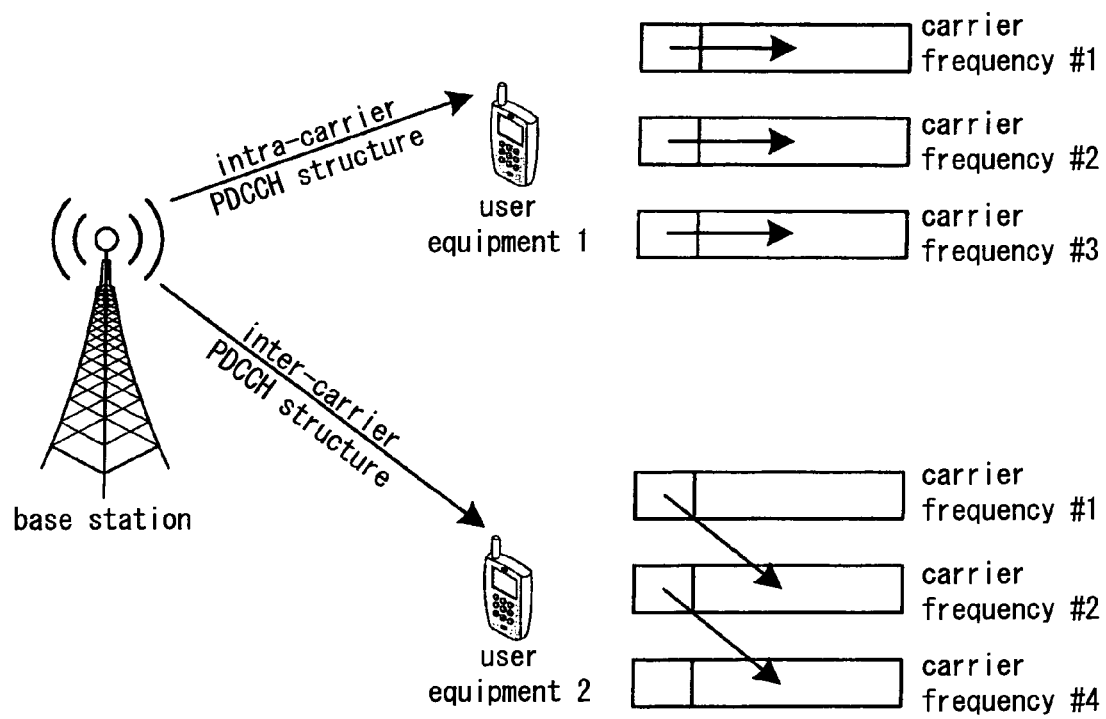

MOBILE COMMUNICATION SYSTEM AND METHOD, BASE STATION AND USER EQUIPMENT

TECHNICAL FIELD

The present invention relates generally to mobile communication technology fields. More specifically, the present invention relates to an implementation method for a downlink control channel in LTE-Advanced and 4G systems.

BACKGROUND ART

3GPP (3rd Generation Partnership Project) has determined in RAN1#53bis Meeting that downlink bandwidth of LTE-Advanced (Long Term Evolution Advanced) system will adopt Carrier Aggregation technologies which may support a system bandwidth larger than 20 MHz. This brings more flexibility to designs of the downlink control channels, while causing new challenges for choosing one of the designs.

Currently, various companies proposed their outstanding optional schemes respectively. NEC Corporation in its contribution (Downlink control structure for carrier aggregation approach in LTE-Advanced system, R1-083491, RAN1#54bis, NEC, October 2008) summarizes these schemes into five categories.

The first kind of scheme is illustrated in FIG. 1. A control channel is provided on each carrier frequency for transmitting corresponding control information on that carrier frequency. The control signaling on each carrier frequency needs to be decoded independently. This scheme is able to be fully compatible with the LTE system and may reuse existing PDCCH (Physical Downlink Control Channel) structure and DCI (Downlink Control Information) format.

The second kind of scheme is illustrated in FIG. 2. The control channel is provided only on one carrier frequency. The control information for allocating PDSCH (Physical Downlink Shared Channel) data to respective carrier frequencies is encoded and mapped to the control channel region separately. This scheme has the advantages that it needs only to perform decoding for the control signaling on one carrier frequency, existing PDCCH structure and DCI (Downlink Control Information) in LTE system may be reused and backward compatibility may be achieved. However, in this scheme, PDCCHs for all users locate on one carrier frequency, whose bandwidth limits the size of PDCCH, and it is probably necessary to introduce new DCI formats with an indication to the carrier frequency identifier.

The third kind of scheme is illustrated in FIG. 3. The control channel is provided on only one carrier frequency. The control information for allocating PDSCH data to respective carrier frequencies is jointly encoded. This scheme has advantage of further removing redundant control information, however this scheme increases DCI formats as well as the number of blind decoding.

The fourth kind of scheme is illustrated in FIG. 4. A PDCCH may span across all system carrier frequencies and allocate PDSCH data to respective carrier frequencies. This scheme makes PDCCH and DCI format to span across all system carrier frequencies and compresses redundant contents of the control information. The bandwidth available for the PDCCH is wide enough for all user equipments. However, this scheme is not backward compatible and the control information on respective carrier frequencies needs to be jointly encoded. New DCI formats need to be defined and the number of blind decoding will be increased.

The fifth kind of scheme is illustrated in FIG. 5, in which PDCCH is detected according to user capability and its configured system bandwidth. PDCCH of the user locates at a system carrier frequency allocated to the user and the control information for assigning PDSCH data to corresponding carrier frequency is separately encoded. In this scheme, the user equipment only needs to detect some system carrier frequencies.

In a recent 3GPP RAN1 No. 57 Meeting in U.S.A., downlink control channel design of the LTE-Advanced system is divided into two categories after many rounds of discussions (Summary of email discussion on bandwidth extension, R1-092219, RAN1 #57, Nokia, May 2009). The first category configures a separate PDCCH to each carrier frequency. The second category allocates a common PDCCH to multiple carrier frequencies allocated to a certain user and the control information is jointly encoded. The first category is further divided into two sub-categories. In the first sub-category, one PDCCH is used to only indicate resource allocation information on a carrier frequency where the PDCCH locates. In the second sub-category, a PDCCH may be used to indicate resource allocation information on a carrier frequency where the PDCCH locates and on other different carrier frequencies. FIG. 6 concretely shows that PDCCH in Option 1a is used to indicate PDSCH allocation information on a carrier frequency where the PDCCH locates and PDCCH on carrier frequency 1 in Option 1b may be used to indicate not only PDSCH allocation information on the carrier frequency (carrier frequency 1) where the PDCCH locates but also PDSCH allocation information on neighboring carrier frequency (carrier frequency 2). Current discussion result is to make Option 1a as a fundamental scheme and to further study Option 1b.

Above schemes such as Option 1a and Option 1b have their advantages and disadvantages. Option 1a may save carrier frequency indication bits and may be fully compatible with LTE Release 8 structure. Option 1b may flexibly allocate resources. If advantages of these two schemes may be combined, system performance may be further improved and better resource utilization efficiency may be achieved. The present invention proposes a corresponding solution taking into account above issues.

SUMMARY OF INVENTION

The technical problem to be solved by the present invention is how to transmit resource allocation information for respective scheduled users through PDCCH with higher efficiency in a wide-band mobile communication system adopting Carrier Aggregation technologies.

The present invention aims to effectively utilize two fundamental PDCCH structures in a mixed way and to flexibly perform configuration such that advantages of two schemes may be obtained and system performance may be further improved.

According to the present invention, a mobile communication system where a base station and a user equipment communicate on multiple aggregated carriers is provided. In the mobile communication system, the base station notifies, to the user equipment, information which is relevant to inclusion of an information field indicating scheduling carrier in downlink control information format by using radio resource control signaling, and the user equipment obtains downlink control information in the downlink control information format according to the information which is relevant to inclusion of the information field indicating scheduling carrier.

According to the present invention, the base station notifies semi-statically, to the user equipment, the information which is relevant to inclusion of the information field indicating scheduling carrier in downlink control information format.

According to the present invention, a mobile communication system where a base station and a user equipment communicate on multiple aggregated carriers is further disclosed. In the mobile communication system, the base station notifies, to the user equipment, information which is relevant to inclusion of an information field indicating scheduling carrier in downlink control information format on respective carriers by using radio resource control signaling, and the user equipment obtains downlink control information in the downlink control information format on respective carriers according to the information which is relevant to inclusion of the information field indicating scheduling carrier.

According to the present invention, a mobile communication system where a base station and a user equipment communicate on multiple aggregated carriers is further disclosed. In the mobile communication system, the base station notifies, to the user equipment, information which is relevant to inclusion of an information field indicating scheduling carrier in downlink control information format by using radio resource control signaling, and the user equipment obtains downlink control information in the downlink control information format according to the information which is relevant to inclusion of the information field indicating scheduling carrier, wherein in case that during random access procedure, the user equipment receives, from the base station, downlink control information in the downlink control information format not including the information field indicating scheduling carrier.

According to the present invention, a mobile communication system where a base station and a user equipment communicates on multiple aggregated carriers is further disclosed. In the communication system, the base station notifies, to the user equipment, information which is relevant to inclusion of an information field indicating scheduling carrier in downlink control information format by using radio resource control signaling, and the user equipment determines, the number of bits in the information field of the downlink control information format according to the number of scheduling carriers.

According to the present invention, a base station which communicates with a user equipment on multiple aggregated carriers is provided. The base station comprises means for notifying, to the user equipment, information which is relevant to inclusion of an information field indicating scheduling carrier in downlink control information format by using radio resource control signaling.

According to the present invention, the means for notifying is configured to notify semi-statically to, the user equipment, the information which is relevant to inclusion of the information field indicating scheduling carrier in downlink control information format.

According to the present invention, a base station which communicates with a user equipment on multiple aggregated carriers is further provided. The base station comprises: means for notifying, to the user equipment, information which is relevant to inclusion of an information field indicating scheduling carrier in downlink control information format on respective carriers by using radio resource control signaling.

According to the present invention, a base station which communicates with a user equipment on multiple aggregated carriers is further disclosed. The base station comprises: means for notifying, to the user equipment, information which is relevant to inclusion of an information field indicating scheduling carrier in downlink control information format by using radio resource control signaling, wherein, in case that during random access procedure, the means for notifying is configured to notify, to the user equipment, downlink control information in the downlink control information format not including the information field indicating scheduling carrier.

According to the present invention, a user equipment which communicates with a base station on multiple aggregated carriers is provided. The user equipment comprises: means for receiving, from the base station, information which is relevant to inclusion of the information field indicating scheduling carrier in downlink control information format by using radio resource control signaling, and means for obtaining downlink control information in the downlink control information format according to the information which is relevant to inclusion of the information field indicating scheduling carrier.

According to the present invention, the information which is relevant to inclusion of the information field indicating scheduling carrier in downlink control information format is notified semi-statically from the base station.

According to the present invention, a user equipment which communicates with a base station on multiple aggregated carriers is further provided. The user equipment comprises: means for receiving, from the base station, information which is relevant to inclusion of an information field indicating scheduling carrier in downlink control information format on respective carriers by using radio resource control signaling, and means for obtaining downlink control information in the downlink control information format according to the information which is relevant to inclusion of the information field indicating scheduling carrier.

According to the present invention, a user equipment which communicates with a base station on multiple aggregated carriers is further provided. The user equipment comprises: means for receiving, from the base station, information which is relevant to inclusion of an information field indicating scheduling carrier in downlink control information format by using radio resource control signaling, and means for obtaining downlink control information in the downlink control information format according to the information which is relevant to inclusion of the information field indicating scheduling carrier, wherein, in case that during random access procedure, the means for receiving receives, from the base station, the downlink control information in the downlink control information format not including the information field indicating scheduling carrier.

According to the present invention, a user equipment which communicates with a base station on multiple aggregated carriers is further provided. The user equipment comprises: means for receiving, from the base station, information which is relevant to inclusion of an information field indicating scheduling carrier in downlink control information format by using radio resource control signaling, and means for determining the number of bits in the information field of the downlink control information format according to the number of scheduling carriers.

According to the present invention, a communication method for a base station which communicates with a user equipment on multiple aggregated carriers is provided. The communication method for a base station comprises: notifying, to the user equipment, information which is relevant to inclusion of an information field indicating scheduling carrier in downlink control information format by using radio resource control signaling.

According to the present invention, the base station notifies semi-statically, to the user equipment, the information which is relevant to inclusion of the information field indicating scheduling carrier in downlink control information format.

According to the present invention, a communication method for a base station which communicates with a user equipment on multiple aggregated carriers is further provided. The communication method for a base station comprises: notifying, to the user equipment, information which is relevant to inclusion of an information field indicating scheduling carrier in downlink control information format on respective carriers by using radio resource control signaling.

According to the present invention, a communication method for a base station which communicates with a user equipment on multiple aggregated carriers is further provided. The communication method for a base station comprises: notifying, to the user equipment, information which is relevant to inclusion of an information field indicating scheduling carrier in downlink control information format by using radio resource control signaling, and in case that during random access procedure, notifying, to the user equipment, downlink control information in the downlink control information format not including the information field indicating scheduling carrier.

According to the present invention, a communication method for a user equipment which communicates with a base station on multiple aggregated carriers is provided. The communication method for a user equipment comprises: receiving, from the base station, information which is relevant to inclusion of an information field indicating scheduling carrier in downlink control information format by using radio resource control signaling, and obtaining downlink control information in the downlink control information format according to the information which is relevant to inclusion of the information field indicating scheduling carrier.

According to the present invention, the information which is relevant to inclusion of the information field indicating scheduling carrier in downlink control information format is notified semi-statically from the base station.

According to the present invention, a communication method for a user equipment which communicates with a base station on multiple aggregated carriers is further provided. The communication method for a user equipment comprises: receiving, from the base station, information which is relevant to inclusion of an information field indicating scheduling carrier in downlink control information format on respective carriers by using radio resource control signaling, and obtaining downlink control information in the downlink control information format according to the information which is relevant to inclusion of the information field indicating scheduling carrier.

According to the present invention, a communication method for a user equipment which communicates with a base station on multiple aggregated carriers is further provided. The communication method for a user equipment comprises: receiving, from the base station, information which is relevant to inclusion of an information field indicating scheduling carrier in downlink control information format by using radio resource control signaling, and obtaining downlink control information in the downlink control information format according to the information which is relevant to inclusion of the information field indicating scheduling carrier, wherein, in case that during random access procedure, receiving, from the base station, downlink control information in the downlink control information format not including the information field indicating scheduling carrier.

According to the present invention, a communication method for a user equipment which communicates with a base station on multiple aggregated carriers is further provided. The communication method for a user equipment comprises: receiving, from the base station, information which is relevant to inclusion of an information field indicating scheduling carrier in downlink control information format by using radio resource control signaling, and determining, the number of bits in the information field of the downlink control information format according to the number of scheduling carriers.

In order to achieve these and/or other advantages, according to the technical object of present invention, a method for configuring downlink control channel format is disclosed as explained concretely and extensively here. The method comprises steps of a user equipment synchronizing with one system carrier frequency and adopting default downlink control channel format to receive broadcast information and information required for performing random access; the user equipment performing the random access according to received information required for performing the random access; the user equipment reporting capability of itself to a base station being successfully accessed, after detecting and determining that the random access is successful on the synchronized system carrier frequency by using the default downlink control channel format; the base station performing user equipment scheduling according to the reported capability from the user equipment, determining downlink working carrier frequencies and downlink control channel format for the user equipment and notifying to the user equipment; and the user equipment switching and/or maintaining the downlink working carrier frequencies and downlink control channel format according to received downlink working carrier frequency and downlink control channel format determined by the base station.

Preferably, the user equipment performs cell search by a predetermined algorithm so as to synchronize with one system carrier frequency.

Preferably, the user equipment reporting capability of itself to the successfully accessed base station comprises transmitting from the user equipment to the base station the radio resource control (RRC) signaling including at least the capability of the user equipment and requesting to establish radio resource control connection.

Preferably, during the user equipment scheduling, the base station performs scheduling not only based on the capability reported by the user equipment but also based on system load.

Preferably, the base station notifies the user equipment the downlink working carrier frequency and downlink control channel format for the user equipment through the radio resource control (RRC) signaling.

Preferably, the user equipment adopts the default downlink control channel format to perform blind decoding on one system carrier frequency where it synchronizes and to obtain the downlink working carrier frequency and downlink control channel format notified by the base station.

Preferably, through scheduling of the user equipment the base station determines uplink working carrier frequencies for the user equipment, besides the downlink working carrier frequency and downlink control channel format, and notifies results to the user equipment.

More preferably, the user equipment adopts the default downlink control channel format to perform blind decoding on the system carrier frequency where it synchronize, to obtain the uplink working carrier frequencies notified by the base station and switches and/or maintains the uplink working carrier frequencies.

Preferably, the downlink working carrier frequency and downlink control channel format for the user equipment comprise a plurality of downlink working carrier frequencies and a plurality of downlink control channel formats corresponding to respective downlink working carrier frequencies.

Preferably, the user equipment adjusts a power amplifier, switches to one or more downlink working carrier frequencies and adopts the downlink control channel format corresponding to the one or more downlink working carrier frequencies to perform blind decoding on respective downlink working carrier frequencies and to obtain corresponding uplink and/or downlink control information.

Preferably, the downlink control channel format comprises intra-carrier downlink control channel format (as Option 1a in FIG. 6) and inter-carrier downlink control channel format (as Option 1b in FIG. 6); and the default downlink control channel format is intra-carrier downlink control channel format. More preferably, when the downlink control channel format corresponding to some downlink working carrier frequencies is inter-carrier downlink control channel format, the user equipment determines dynamically carrier frequency indication bits in the downlink control information format according to the number of downlink working carrier frequencies for the user equipment.

Preferably, the base station may configure that the downlink control channel format of several carrier frequencies among the working carrier frequencies is inter-carrier downlink control channel format.

Preferably, the base station may configure that the downlink control channel format of several carrier frequencies among the working carrier frequencies is intra-carrier downlink control channel format.

According to the proposed scheme in the present invention, it is possible to schedule PDCCH structure utilized by the user equipment based on feedback information from the user equipment and, through corresponding signaling notification mechanism, the user equipment may correctly acknowledge the PDCCH structure to be used and perform corresponding blind decoding so that correct channel estimation and data demodulation may be carried out. The present scheme is simple and effective and may guarantee that the communication system will operate with high efficiency.

BRIEF DESCRIPTION OF DRAWINGS

The foregoing and other objectives, features, and advantages of the invention will be more readily understood upon consideration of the following detailed description of the invention, taken in conjunction with the accompanying drawings.

FIG. 7 is a schematic diagram illustrating a scheme example of first embodiment according to the present invention;

DESCRIPTION OF EMBODIMENTS

In order to clearly and concretely explain the implementation steps of the present invention, embodiments of the present invention, which are applicable to multiple carrier frequency mobile communication system supporting Carrier Aggregation technology, especially LTE-Advanced cellular mobile communication system, are described as follows. Note that the present invention is not limited to these applications, but is also applicable to other relative communication system.

Preferred embodiments will be explained in detail by referring to the accompanying drawings. Unnecessary parts and functions for the present invention will be omitted for brevity so as to avoid confusion in understanding.

Figure 1:
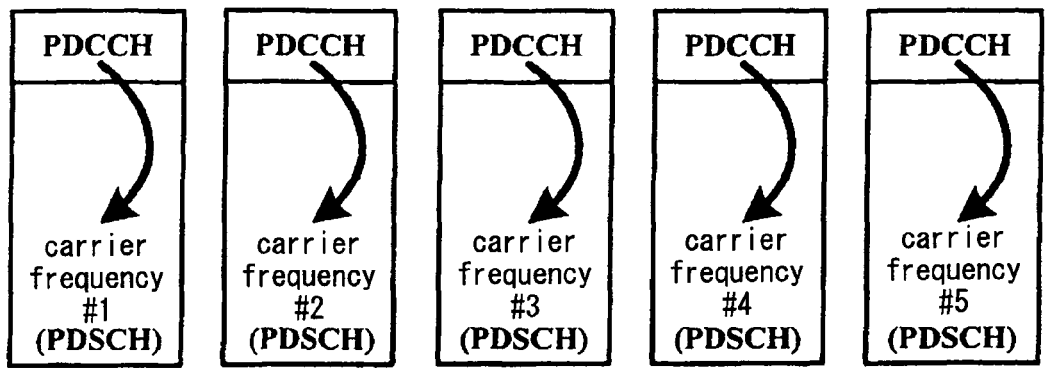
FIG. 1 illustrates an existing reference technical scheme 1.
Figure 2:
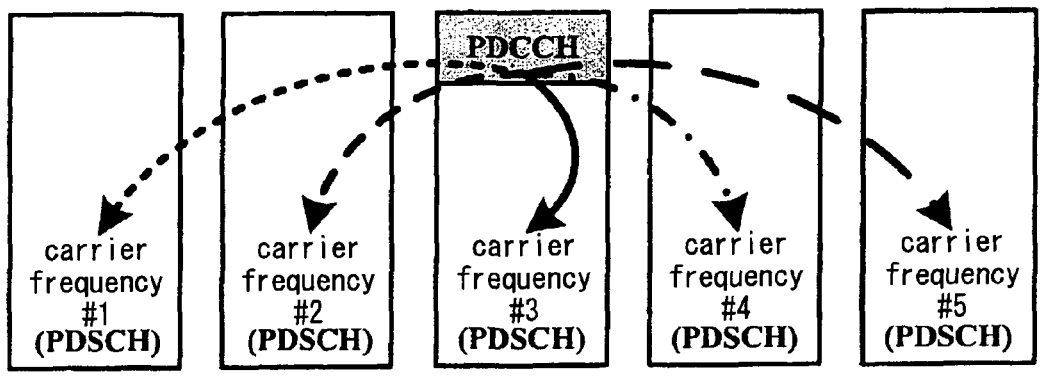
FIG. 2 illustrates an existing reference technical scheme 2.
Figure 3:
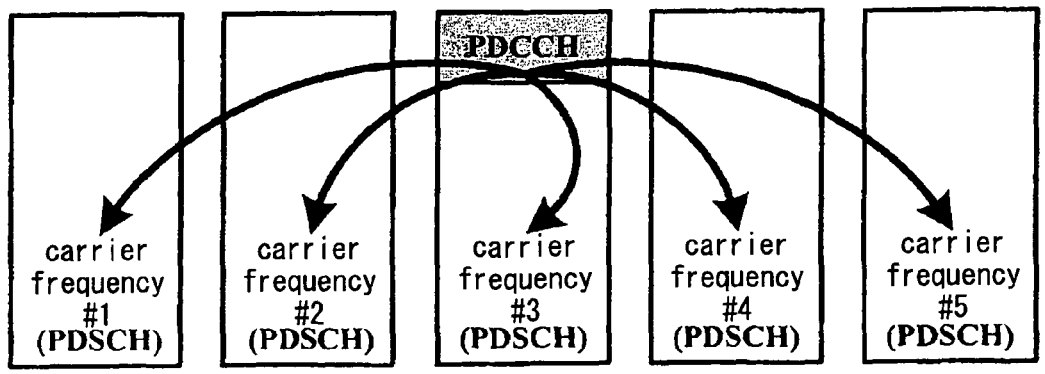
FIG. 3 illustrates an existing reference technical scheme 3.
Figure 4:
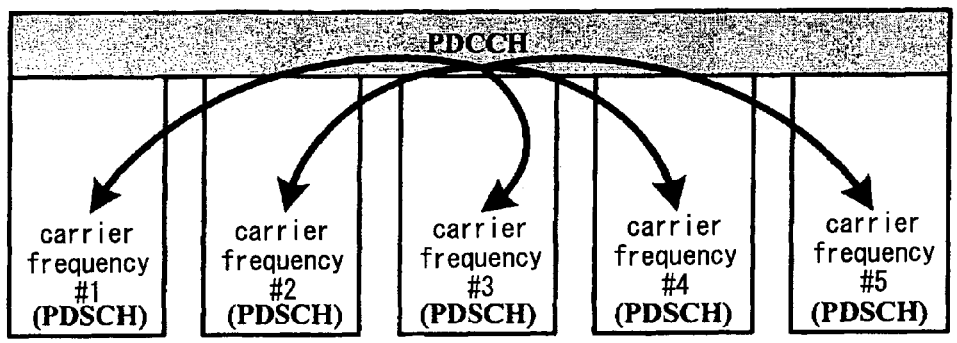
FIG. 4 illustrates an existing reference technical scheme 4.
Figure 5:
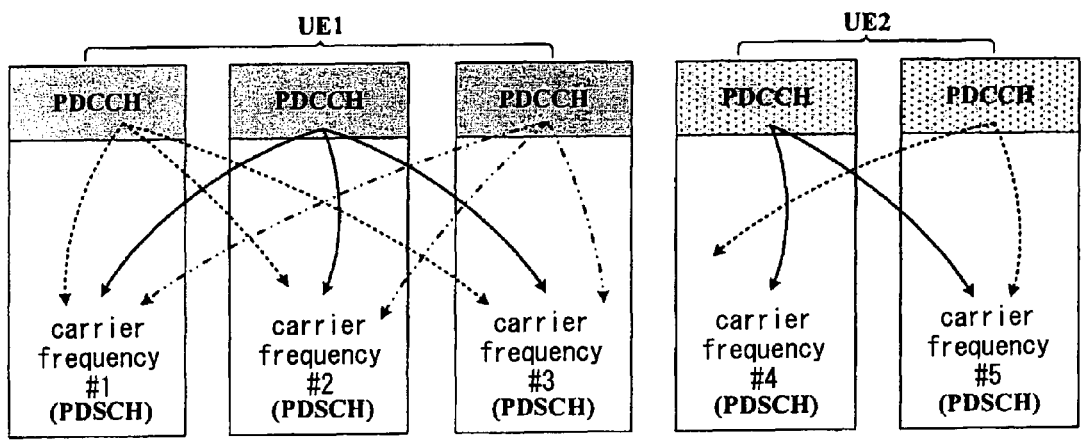
FIG. 5 illustrates an existing reference technical scheme 5.
Figure 6:
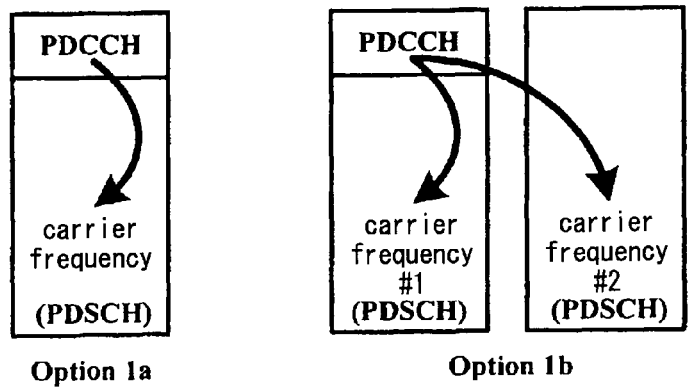
FIG. 6 illustrates Option 1a and Option 1b in which PDCCHs of respective carrier frequencies are separately encoded.

Before explaining embodiments of the present invention, two kinds of basic PDCCH structures referred to in the present invention will be firstly described. Structure 1: as shown as Option 1a in FIG. 6, PDCCH on a certain carrier frequency indicates only resource allocation information on the certain carrier frequency and the PDCCH does not include information fields relevant to the carrier frequency. Structure 2: as shown as Option 1b in FIG. 6, PDCCH on a certain carrier frequency may indicate the resource allocation information on any carrier frequency in the system including the certain carrier frequency where current PDCCH locates, and the PDCCH includes information field relevant to the carrier frequency for indicating corresponding carrier frequency identifier. For clearer description, Structure 1 is named as intra-carrier PDCCH structure and Structure 2 is named as inter-carrier PDCCH structure.

Embodiment 1

Figure 8:
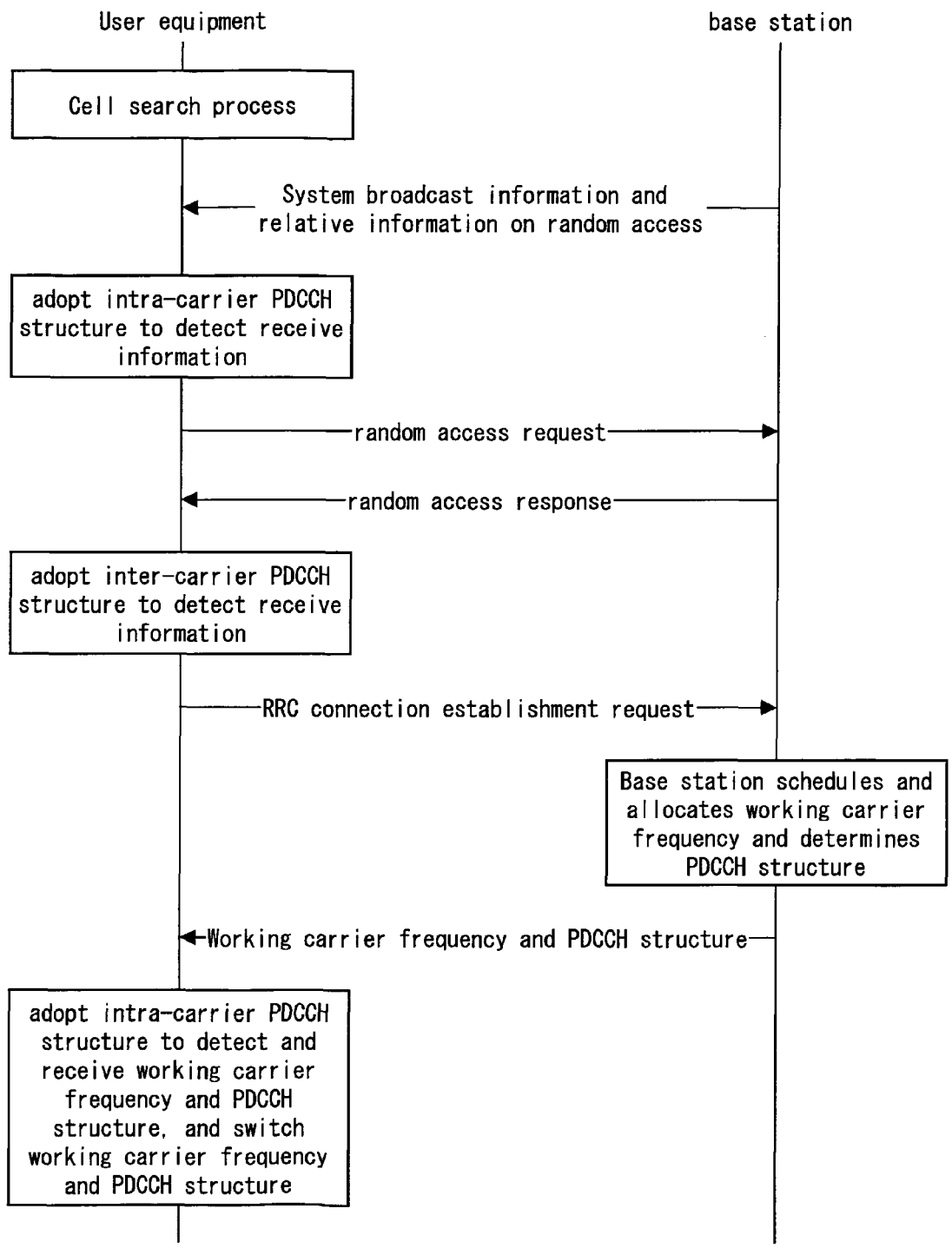
FIG. 8 is a schematic diagram illustrating a general operation flow chart according to the present invention.

FIG. 7 illustrates a system model of the first scheme in which a base station schedules a user equipment according to measurement information fed back from current user equipment, allocates carrier frequencies to the user equipment and notifies the user equipment which PDCCH structure shall be adopted for blind decoding through higher layer signaling. FIG. 8 illustrates the detailed steps as follows.

Step 1: the user equipment performs cell search and receives broadcast information.

The system adopts default intra-carrier PDCCH structure to obtain downlink common control channel information. The system bandwidth is aggregated by multiple carrier frequencies. The user equipment firstly synchronizes with one certain system carrier frequency, detects and receives corresponding system broadcast information and relevant information required for random access by using the intra-carrier PDCCH structure on that certain carrier frequency.

Step 2: the user equipment performs random access procedure.

The user equipment initiates a random access request on an uplink system carrier frequency designated by the base station according to the received information for the random access procedure. The user equipment uses the intra-carrier PDCCH structure to perform PDCCH blind decoding on the carrier frequency where it synchronizes and to obtain random access response information.

Step 3: carrier frequency allocation and PDCCH structure determination procedure The user equipment transmits to the base station a higher layer signaling, which at least includes user equipment capability such as supportable bandwidth capability, to request establishing RRC (radio resource control) connection. The base station schedules the user equipment according to the user equipment capability, system load and etc., decides uplink/downlink working carrier frequencies and PDCCH structure for the user equipment and notifies results to the user equipment through the higher layer signaling. The user equipment performs blind detection on the carrier frequency with which it synchronizes and obtains the higher layer signaling by using the intra-carrier PDCCH structure.

Step 4: Switching working carrier frequencies and PDCCH structure.

The user equipment adjusts power amplifiers, switches to one or more allocated working carrier frequencies and performs blind decoding for respective working carrier frequencies according to the PDCCH structure indicated in the higher layer signaling in Step 3 so as to obtain the downlink control information required by the user equipment.

In the present embodiment, in case that during random access procedure, the user equipment receives, from the base station, downlink control information in the downlink control information format not including the information field indicating scheduling carrier.

After the user equipment successfully accesses the system, its PDCCH structure may be switched semi-statically through following two methods.

Figure 9:
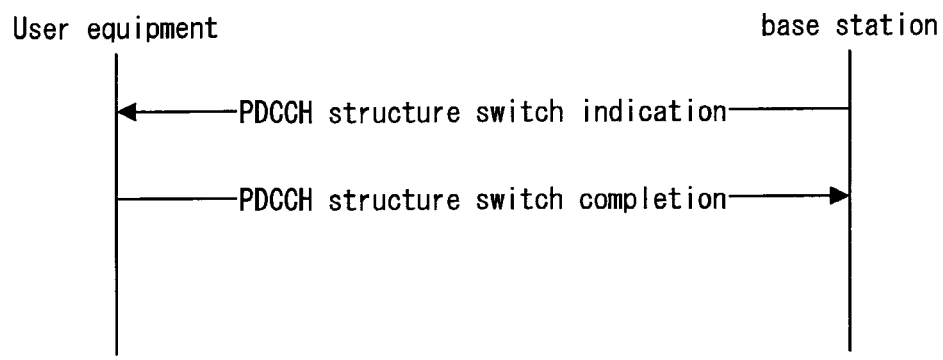
FIG. 9 illustrates a PDCCH structure switch message transmission method 1.

Method 1 (referring to FIG. 9): the base station instructs the user equipment to switch the PDCCH structure through the higher layer signaling. After receiving correctly the switch indication signaling, the user equipment changes the PDCCH blind decoding structure and feedbacks the switch completion information to the base station through the higher layer signaling. For example, a PDCCH structure indication may be added into RRCConnectionReconfiguration signaling. After receiving the PDCCH structure indication in the RRCConnectionReconfiguration signaling, the user equipment feedbacks an RRCConnectionReconfigurationComplete signaling to the base station and performs corresponding blind decoding by using the new PDCCH structure.

Figure 10:
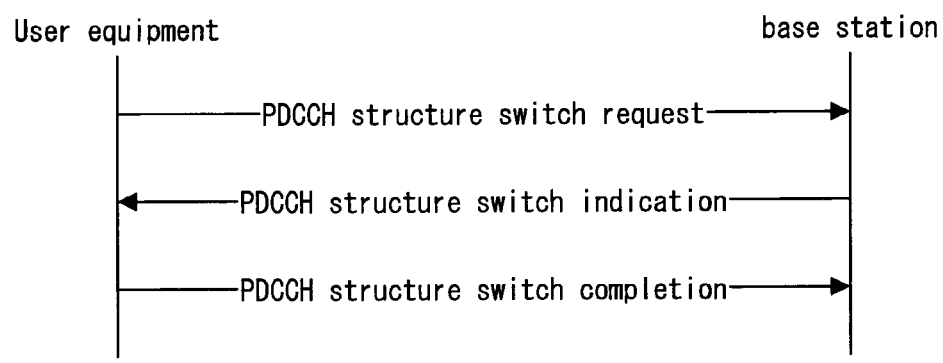
FIG. 10 illustrates a PDCCH structure switch message transmission method 2.

Method 2 (referring to FIG. 10): the user equipment initiates a PDCCH structure switch request to the base station through the higher layer signaling. After receiving correctly the request information and approving the switch, the base station transmits PDCCH structure switch indication to the user equipment through the higher layer signaling. After receiving correctly the switch indication signaling, the user equipment changes the PDCCH blind decoding structure and feedbacks switch completion information to the base station through the higher layer signaling.

As illustrated in FIG. 7, user equipment 1 works at carrier frequencies #1-#3. The base station notifies it to adopt the intra-carrier PDCCH structure to perform PDCCH blind decoding for respective working carrier frequencies. PDCCH on each carrier frequency is used to indicate resource allocation on that carrier frequency.

User equipment 2 works at carrier frequencies #1, #2 and #4. Assuming that no OFDM symbols for transmitting the control information will be reserved on carrier frequency #4 since it is a special carrier frequency, the base station notifies, through the higher layer signaling, the user equipment to adopt the inter-carrier PDCCH structure to perform PDCCH blind decoding on the control symbols of carrier frequencies #1 and #2 and determines which carrier frequency the control information in DCI is used for the resource allocation of according to the carrier frequency indication bit information in DCI format. For example, as illustrated in FIG. 7, PDCCH in carrier frequency #1 indicates resource allocation in carrier frequency #2 and PDCCH in carrier frequency #2 indicates resource allocation in carrier frequency #4.

In the present embodiment, the base station notifies, to the user equipment, information which is relevant to inclusion of an information field indicating scheduling carrier in downlink control information format by using radio resource control signaling, and the user equipment obtains downlink control information in the downlink control information format according to the information which is relevant to inclusion of the information field indicating scheduling carrier.

Note that there probably is a case in which a user equipment has multiple PDCCHs on one carrier frequency and the multiple PDCCHs are respectively used to indicate resource allocation information of current carrier frequency and/or other carrier frequencies. FIG. 7 only illustrates an example of one PDCCH on one carrier frequency.

Embodiment 2

Because capabilities of user equipments are different from each other and actually the number of working carrier frequencies that might be allocated to respective user equipments may be different, adopting fixed bit number in the inter-carrier PDCCH structure to indicate working carrier frequency identifier (ID) wastes resources. The present embodiment proposes adjusting dynamically the carrier frequency indication bit in DCI format according to the actual number of working carrier frequencies of the user equipment.

It is assumed that user equipment 1 and user equipment 2 have different bandwidth capability, user equipment 1 is able to work simultaneously on two carrier frequencies and user equipment 2 is able to work simultaneously on three carrier frequencies.

Figure 11:
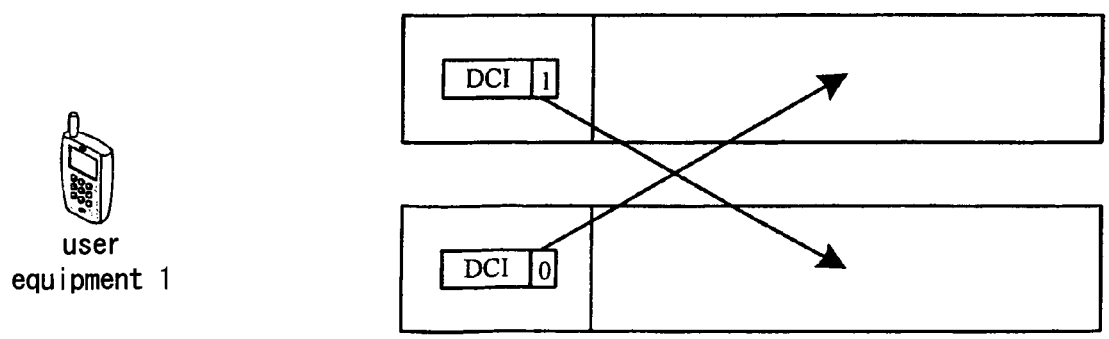
FIG. 11 is a schematic diagram illustrating a first scheme example of second embodiment according to the present invention.

As illustrated in FIG. 11, according to the higher layer signaling for working carrier frequency allocation information transmitted from the base station, user equipment 1 may acknowledge that the number of working carrier frequencies allocated to itself is 2 and only 1 bit is able to differentiate these two working carrier frequencies. According to the information on the number of working carrier frequencies, user equipment 1 approves that the default bit number for indicating the carrier frequency information is 1 in its DCI format of PDCCH. User equipment 1 adopts a DCI format with 1 bit of carrier frequency indication information to blindly decoding PDCCH contents matched to the DCI format.

Figure 12:
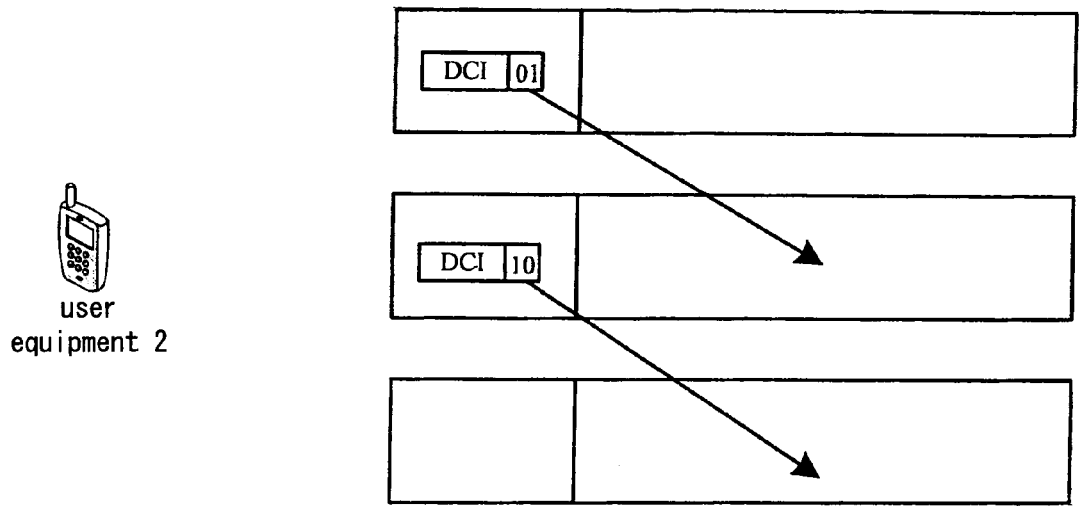
FIG. 12 is a schematic diagram illustrating a second scheme example of second embodiment according to the present invention.

As illustrated in FIG. 12, according to the higher layer signaling for working carrier frequency allocation information transmitted from the base station, user equipment 2 may deduce that the number of allocated working carrier frequencies is 3 and now 2 bits are able to differentiate these three working carrier frequencies. According to the information on the number of working carrier frequencies, user equipment 2 approves that the default bit number for indicating the carrier frequency information is 2 in its DCI format of PDCCH. User equipment 2 adopts a DCI format with 2 bits of carrier frequency indication information to blindly decoding PDCCH contents matched to the DCI format.

In the present embodiment, the user equipment determines, the number of bits in the information field of the downlink control information format according to the number of scheduling carriers.

Embodiment 3

According to the user equipment capability, the user equipment may be configured to adopt simultaneously the intra-carrier PDCCH structure and the inter-carrier PDCCH structure to perform PDCCH blind decoding.

Figure 13:
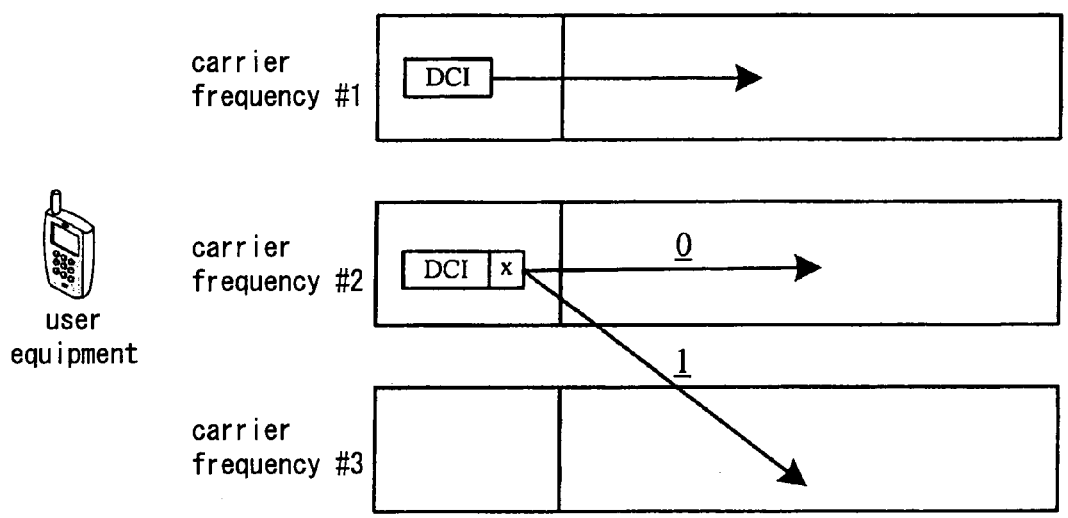
FIG. 13 is a schematic diagram illustrating a scheme example of third embodiment according to the present invention.

As illustrated in FIG. 13, it is assumed that no OFDM symbols will be reserved for transmitting any control information on system carrier frequency #3. The base station configures carrier frequencies #1-#3 to the user equipment according to the user equipment capability and corresponding system load, and notifies, through the higher layer signaling, the user equipment to adopt intra-carrier PDCCH structure on the carrier frequency #1 so as to perform blind decoding for the control information on the carrier frequency #1 and notifies the user equipment to adopt inter-carrier PDCCH structure on the carrier frequency #2 so as to perform blind decoding for the control information on the carrier frequencies #2 and #3 (as illustrated in FIG. 13, "x" indicates carrier frequency #2 when it is set to 0 and indicates carrier frequency #3 when it is set to 1).

In other words, the base station notifies, to the user equipment, information which is relevant to inclusion of an information field indicating scheduling carrier in downlink control information format on respective carriers by using radio resource control signaling, and the user equipment obtains downlink control information in the downlink control information format on respective carriers according to the information which is relevant to inclusion of the information field indicating scheduling carrier.

In accordance with above proposed control signaling transmission scheme for multiple carrier aggregation system, it is possible to semi-statically configure PDCCH structure to the user equipment, to attain advantages of both intra-carrier PDCCH structure and inter-carrier PDCCH structure and to obtain better system performance. The present scheme design is simple and effective and complexity of the system design is low such that design requirements of real system and LTE-Advanced system may be satisfied.

In the above descriptions, multiple examples are described aiming at respective steps. Although the inventor exerts himself to explain relative examples, it does not mean that these examples should have corresponding relationship according to the representing numerals. As long as there is no contradiction between conditions limited in the selected examples, examples with un-corresponding representing numerals may constitute a technical solution and such technical solution shall be considered as being encompassed by the present invention.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A mobile communication system comprising: a base station; and a user equipment, wherein the base station and the user equipment are configured to communicate on aggregated carriers, the base station is configured to: transmit using a radio resource control signal, to the user equipment, first information which is used to indicate whether a carrier indicator field is present or not in a second downlink control information format for each of the aggregated carriers, transmit using a physical downlink control channel on a first carrier, to the user equipment, second information in the second downlink control information format, the second downlink control information format being transmitted based on a number of bits of the second downlink control information format, the number of bits of the second downlink control information format being given by the first information which is used to indicate whether the carrier indicator field is present or not in the second downlink control information format, transmit using the physical downlink control channel, to the user equipment, third information in a third downlink control information format, the third downlink control information format being used for transmitting random access response information in a random access procedure, transmit, to the user equipment, the random access response information based on the third downlink control information format transmitted using the physical downlink control channel, and transmit, to the user equipment, a physical downlink shared channel on a second carrier based on the second downlink control information format transmitted using the physical downlink control channel on the first carrier, wherein in a case that the carrier indicator field is present in the second downlink control information format, the second downlink control information format in which the carrier indicator field is presented which is transmitted using the physical downlink control channel on the first carrier is used for scheduling of the physical downlink shared channel on the second carrier, and the carrier indicator field is not presented in the third downlink control information format including the third information.

2. The mobile communication system of claim 1, wherein the base station is configured to transmit semi-statically, to the user equipment, the first information which is used to indicate whether the carrier indicator field is present or not in the second downlink control information format.

3. A base station configured to communicate with a user equipment on aggregated carriers, the base station comprising: a transmitting unit configured to: transmit using a radio resource control signal, to the user equipment, first information which is used to indicate whether a carrier indicator field is present or not in a second downlink control information format for each of the aggregated carriers, transmit using a physical downlink control channel on a first carrier, to the user equipment, second information in the second downlink control information format, the second downlink control information format being transmitted based on a number of bits of the second downlink control information format, the number of bits of the second downlink control information format being given by the first information which is used to indicate whether the carrier indicator field is present or not in the second downlink control information format, transmit using the physical downlink control channel, to the user equipment, third information in a third downlink control information format, the third downlink control information format being used for transmitting random access response information in a random access procedure, transmit, to the user equipment, the random access response information based on the third downlink control information format transmitted using the physical downlink control channel, and transmit, to the user equipment, a physical downlink shared channel on a second carrier based on the second downlink control information format transmitted using the physical downlink control channel on the first carrier, wherein in a case that the carrier indicator field is present in the second downlink control information format, the second downlink control information format in which the carrier indicator field is presented which is transmitted using the physical downlink control channel on the first carrier is used for scheduling of the physical downlink shared channel on the second carrier, and the carrier indicator field is not presented in the third downlink control information format including the third information.

4. The base station of claim 3, wherein the transmitting unit is configured to transmit semi-statically, to the user equipment, the first information which is used to indicate whether the carrier indicator field is present or not in the second downlink control information format.

5. A user equipment configured to communicate with a base station on aggregated carriers, the user equipment comprising: a receiving unit configured to: receive using a radio resource control signal, from the base station, first information which is used to indicate whether a carrier indicator field is present or not in a second downlink control information format for each of the aggregated carriers, receive using a physical downlink control channel on a first carrier, from the base station, second information in the second downlink control information format, the second downlink control information format being received based on a number of bits of the second downlink control information format, the number of bits of the second downlink control information format being given by the first information which is used to indicate whether the carrier indicator field is present or not in the second downlink control information format, receive using the physical downlink control channel, from the base station, third information in a third downlink control information format, the third downlink control information format being used for receiving random access response information in a random access procedure, receive, from the base station, the random access response information based on a detection of the third downlink control information format received using the physical downlink control channel, and receive, from the base station, a physical downlink shared channel on a second carrier based on a detection of the second downlink control information format received using the physical downlink control channel on the first carrier, wherein in a case that the carrier indicator field is present in the second downlink control information format, the second downlink control information format in which the carrier indicator field is presented which is received using the physical downlink control channel on the first carrier is used for scheduling of the physical downlink shared channel on the second carrier, and the carrier indicator field is not presented in the third downlink control information format including the third information.

6. The user equipment of claim 5, wherein the first information which is used to indicate whether the carrier indicator field is present or not in the second downlink control information format is transmitted semi-statically from the base station.

7. A communication method for a base station which is configured to communicate with a user equipment on aggregated carriers, the communication method comprising: transmitting using a radio resource control signal, to the user equipment, first information which is used to indicate whether a carrier indicator field is present or not in a second downlink control information format for each of the aggregated carriers, transmitting using a physical downlink control channel on a first carrier, to the user equipment, second information in the second downlink control information format, the second downlink control information format being transmitted based on a number of bits of the second downlink control information format, the number of bits of the second downlink control information format being given by the first information which is used to indicate whether the carrier indicator field is present or not in the second downlink control information format, transmitting using the physical downlink control channel, to the user equipment, third information in a third downlink control information format, the third downlink control information format being used for transmitting random access response information in a random access procedure, transmitting, to the user equipment, the random access response information based on the third downlink control information format transmitted using the physical downlink control channel, and transmitting, to the user equipment, a physical downlink shared channel on a second carrier based on the second downlink control information format transmitted using the physical downlink control channel on the first carrier, wherein in a case that the carrier indicator field is present in the second downlink control information format, the second downlink control information format in which the carrier indicator field is presented which is transmitted using the physical downlink control channel on the first carrier is used for scheduling of the physical downlink shared channel on the second carrier, and the carrier indicator field is not presented in the third downlink control information format including the third information.

8. The communication method of claim 7, further comprising: transmitting semi-statically, to the user equipment, the first information which is used to indicate whether the carrier indicator field is present or not in the second downlink control information format.

9. A communication method for a user equipment which is configured to communicate with a base station on aggregated carriers, the communication method comprising: receiving using a radio resource control signal, from the base station, first information which is used to indicate whether a carrier indicator field is present or not in a second downlink control information format for each of the aggregated carriers, receiving, using a physical downlink control channel on a first carrier, from the base station, second information in the second downlink control information format, the second downlink control information format being received based on a number of bits of the second downlink control information format, the number of bits of the second downlink control information format being given by the first information which is used to indicate whether the carrier indicator field is present or not in the second downlink control information format, receiving using the physical downlink control channel, from the base station, third information in a third downlink control information format, the third downlink control information format being used for receiving random access response information in a random access procedure, receiving, from the base station, the random access response information based on a detection of the third downlink control information format received using the physical downlink control channel; and receiving, from the base station, a physical downlink shared channel on a second carrier based on a detection of the second downlink control information format received using the physical downlink control channel on the first carrier, wherein in a case that the carrier indicator field is present in the second downlink control information format, the second downlink control information format in which the carrier indicator field is presented which is received using the physical downlink control channel on the first carrier is used for scheduling of the physical downlink shared channel on the second carrier, and the carrier indicator field is not presented in the third downlink control information format including the third information.

10. The communication method for a user equipment of claim 9, wherein the first information which is used to indicate whether the carrier indicator field is present or not in the second downlink control information format is transmitted semi-statically from the base station.

* * * * *